Figure 3:
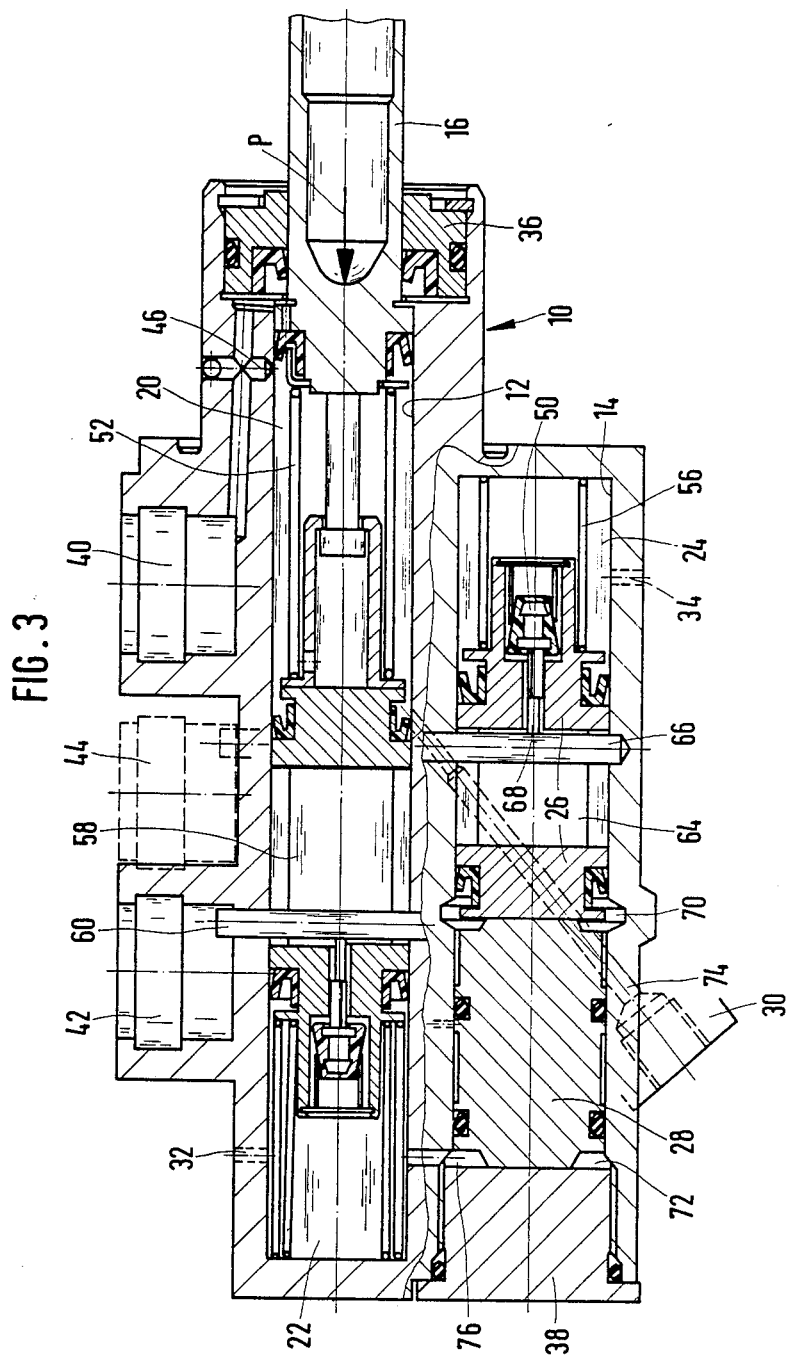

United States Patent [19]

Schlüter

[11] Patent Number: 4,794,757
[45] Date of Patent: Jan. 3, 1989

[54] MASTER BRAKE CYLINDER FOR A HYDRAULIC THREE-CIRCUIT BRAKE SYSTEM

[75] Inventor: Peter Schlüter, Kammerforst, Fed. Rep. of Germany

[73] Assignee: Lucas Industries public limited company, Birmingham, England

[21] Appl. No.: 94,420

[22] Filed: Sep. 9, 1987

[30] Foreign Application Priority Data

Sep. 17, 1986 [DE] Fed. Rep. of Germany ... 8624906[U]
May 7, 1987 [DE] Fed. Rep. of Germany ....... 3715209

[51] Int. Cl.$^4$ .............................................. B60T 11/20
[52] U.S. Cl. ........................................................ 60/562
[58] Field of Search .......................................... 60/562

[56] References Cited

U.S. PATENT DOCUMENTS

| | | | |
|---|---|---|---|
| 3,800,538 | 4/1974 | Jones | 60/562 |
| 4,225,022 | 9/1980 | Belart | 60/562 |
| 4,419,862 | 12/1983 | Farr | 60/562 |
| 4,505,116 | 3/1985 | Weiler | 60/562 |
| 4,505,519 | 3/1985 | Muterel | 60/562 |
| 4,706,459 | 11/1987 | Burckhardt | 60/562 |

*Primary Examiner*—Edward K. Look
*Attorney, Agent, or Firm*—Scrivener and Clarke

[57] ABSTRACT

A housing (10) contains two cylinder bores (12, 14). In one of the cylinder bores (12) two pistons (16, 18) are arranged one behind the other and are displaceable by an external force (P) to subject a first or second pressure chamber (20, 22) to pressure. Two additional pistons (26, 28) are arranged one behind the other in the other cylinder bore (14) and are each displaceable by the pressure in one of said pressure chambers (20, 22) to subject a third pressure chamber (24) to pressure. Three brake circuit connections (30, 32, 34) are each connected to one of the pressure chambers (20, 22, 24). Three reservoir connections (40, 42, 44) are controlled by piston movements and each connected to one of the pressure chambers (20, 22, 24) for as long as it is pressureless. The third pressure chamber (24) is bordered by only one of the two additional pistons (26). The connection between the third pressure chamber (24) and the associated reservoir connection (44) is controlled by the same additional piston (26). The other of the two additional pistons (28) separates from each other chambers (70, 72) which are connected to the first and second pressure chambers (20, 22) respectively. As a result, that one of the additional pistons which borders the third pressure chamber moves on each actuation of the master brake cylinder irrespective of whether all the brake circuits are intact or any one of them has failed.

5 Claims, 3 Drawing Sheets

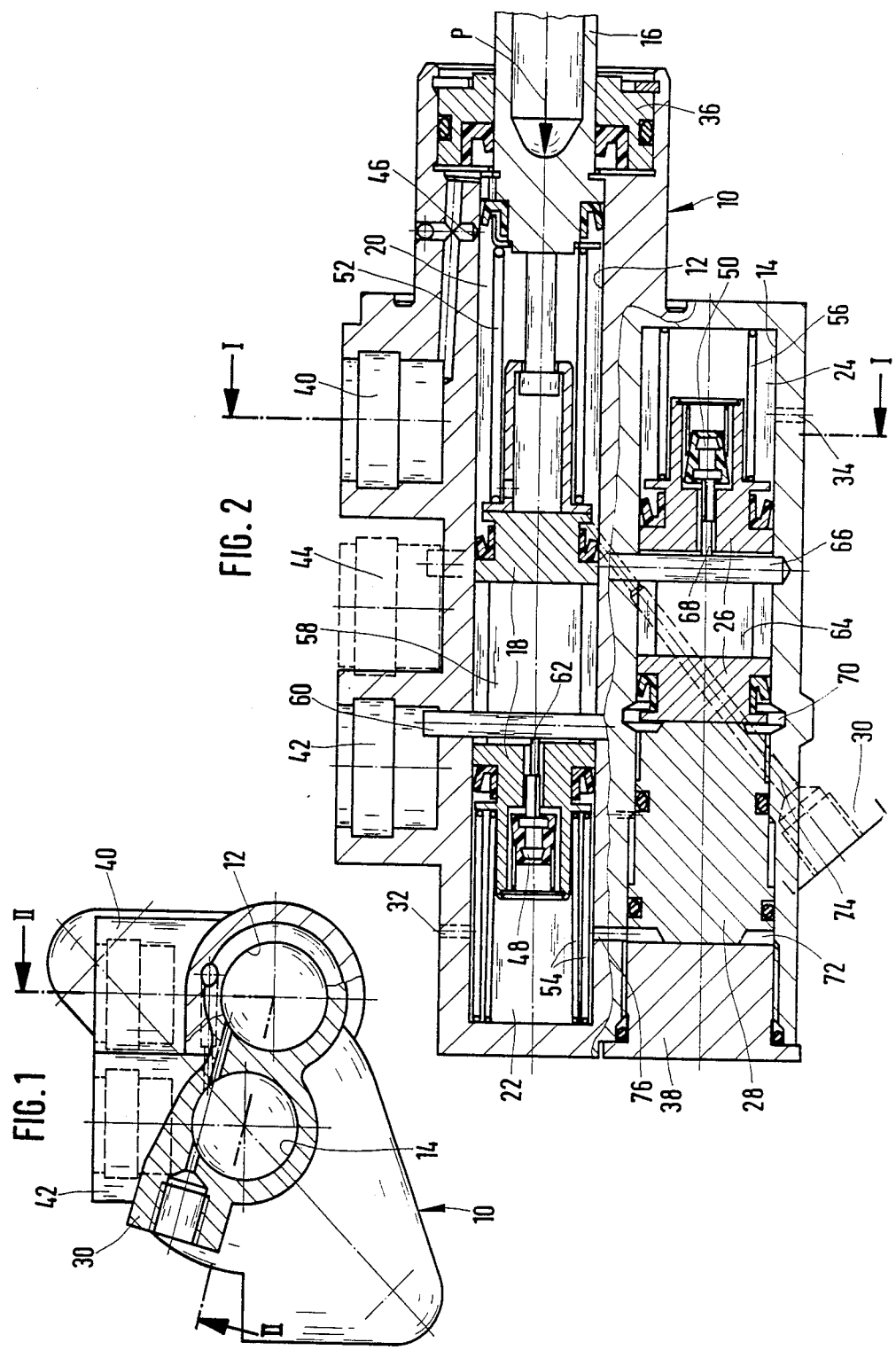

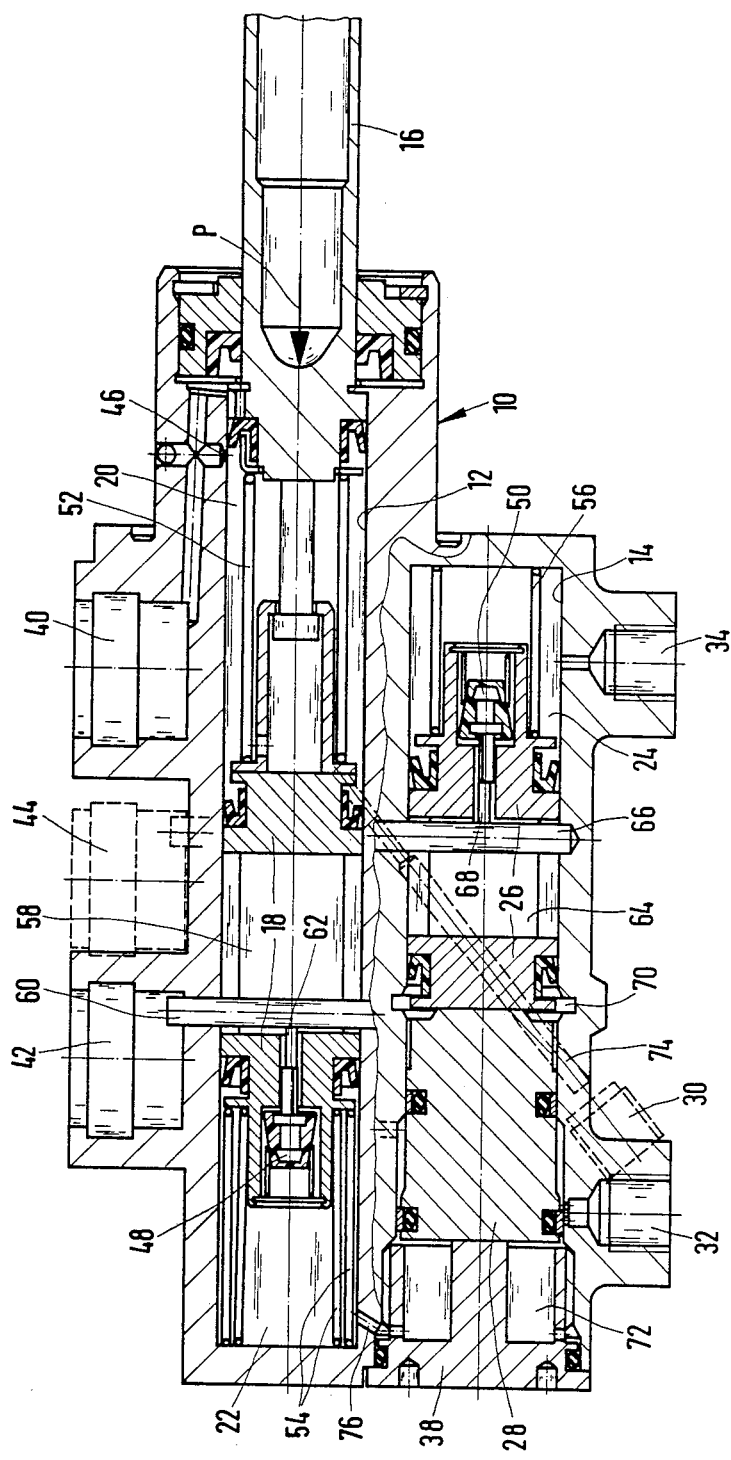

MASTER BRAKE CYLINDER FOR A HYDRAULIC THREE-CIRCUIT BRAKE SYSTEM

The invention relates to a master brake cylinder for a hydraulic three-circuit brake system comprising a housing containing two cylinder bores, two pistons which are arranged one behind the other in one of the cylinder bores and are displaceable by an external force for subjecting a first or second pressure chamber to pressure, two additional pistons which are arranged one behind the other in the other cylinder bore and are displaceable in each case by the pressure in one of said pressure chambers for subjecting a third pressure chamber to pressure, three brake circuit connections each connected to one of the pressure chambers and three reservoir connections which controlled by piston movements are each connected to one of the pressure chambers as long as it is pressureless.

In a known master brake cylinder of this type (DE-PS No. 1,228,953) the first pressure chamber is formed between two portions of different diameter of a first piston whose outer portion with respect to the associated cylinder bore has a larger diameter and a cup for an actuating rod. The other portion of the first piston disposed further within the associated cylinder bore has a smaller diameter which is of equal magnitude to that of a second piston disposed in the same cylinder bore and connected fixedly to the first piston. The second piston comprises a pushrod which projects away from the first cylinder and on the end of which a collar is formed. In the housing three valves are disposed adjacent said cylinder bore, of which a first valve is controlled by the first piston and connects the first pressure chamber to an associated reservoir connection, the second valve is controlled by the second piston and connects a space between the first and second piston to a reservoir connection whilst a third valve is controlled by said collar and connects the second pressure chamber to an associated reservoir connection.

In a second cylinder bore of the known master brake cylinder two additional pistons are biased away from each other by a spring disposed therebetween so that in the unactuated state they each bear on a stop fixed with respect to the housing. The first and second pressure chambers in the first cylinder bore are permanently connected separately from each other each to one end of the second cylinder bore so that the end faces of the two additional pistons remote from each other are always subjected to the pressure obtaining in the first and second pressure chambers respectively. Formed between the two additional pistons in the second cylinder bore is a third pressure chamber which is permanently connected to the space between the first and second pistons in the first cylinder bore and via said space in the rest position of the first and second piston is connected to the associated reservoir connection.

On each actuation of this known master brake cylinder the first and second pistons are moved jointly because of their rigid mechanical connection. When all three brake circuits are intact due to the pressure increase in the first and second pressure chambers both the additional pistons move in the direction towards the centre of the second cylinder bore so that the pressure chamber formed between them is likewise subjected to pressure. If the first brake circuit has failed so that the pressure chamber on actuation of the master brake cylinder remains pressureless, then of the two additional pistons only the one whose end face is subjected to the pressure in the second pressure chamber is displaced. On failure of the second brake circuit, the second pressure chamber then correspondingly remaining pressureless, of the two additional pistons only that whose end face is subjected to the pressure in the first pressure chamber is displaced. In both cases the third pressure chamber is subjected to pressure so that apart from the second or first brake circuit which has not failed the third brake circuit also remains in operation. If however the third brake circuit has failed so that a pressure cannot be built up in the third pressure chamber the two additional pistons move against the action of the spring disposed between them towards each other until they finally abut against each other so that a pressure buildup in the first and second brake circuits remains possible.

The invention is based on the problem of further developing a master brake cylinder of the type described at the beginning so that with at least the same operational reliability a lesser overall length is required than with the known master cylinder arrangement described.

This problem is solved according to the invention in that the third pressure chamber is bordered by only one of the two additional pistons, the connection between the third pressure chamber and the associated reservoir connection is controlled by the same additional piston and the other of the two additional pistons separates from each other chambers which are connected to the first and second pressure chambers respectively.

This achieves that of the two additional pistons the one bordering the third pressure chamber moves on any actuation of the master brake cylinder irrespective of whether all the brake circuits are intact or any one of them has failed. For this reason the piston bordering or defining the third pressure chamber is able to control the associated reservoir connection itself and always in the same manner. Consequently, in contrast to the known master cylinder arrangement described it is not necessary to arrange in the cylinder bore including the first and second pistons means for controlling all the three reservoir connections and provide the considerable overall length necessary for this purpose.

Preferably, the two additional pistons in the rest state are held bearing against each other by a spring disposed in the third pressure chamber.

It is further advantageous for the piston bordering the third pressure chamber to include a central valve for controlling the connection to the associated reservoir connection.

Fundamentally, it suffices if on any normal brake actuation only the additional piston bordering the third pressure chamber is moved. The other additional piston is exposed to the oppositely acting normally equisized pressures in the first and second pressure chambers and thus does not move if its two end faces are of equal magnitude.

To prevent the latter piston becoming difficult to move due to long periods of immobility, the invention can be further developed in that said additional piston not bordering the third pressure chamber is a stepped piston whose larger end face is remote from the other additional piston bordering the third pressure chamber. As a result the two additional pistons in the normal case move jointly and thus remain easy to move in the same manner.

The embodiment of the invention described above is advantageously further developed in that the other of the two additional pistons for as long as it assumes its rest position separates the pressure chamber to the pressure of which it is exposed with its larger end face from the associated brake circuit connection. This is achieved in that the movements of said other additional piston are monitored, for example with a pressure monitor which is connected to the brake circuit controlled by said piston. This avoids the danger of a jamming or rust seizure of said additional piston remaining unnoticed.

Examples of embodiment of the invention will be explained hereinafter in further detail with the aid of schematic drawings, wherein:

FIG. 1 is an end view of a master brake cylinder according to the invention shown partially as cross-section through the plane I—I of FIG. 2, FIG. 2 is a longitudinal section through the plane II—II of FIG. 1 to a greater scale FIG. 3 is a longitudinal section corresponding to FIG. 2 of a modified embodiment of the invention and FIG. 4 is a longitudinal section corresponding to FIG. 2 of a further embodiment of the invention.

The master brake cylinder comprises in all embodiments illustrated a housing 10 intended for attaching to a conventional, and therefore not illustrated, pneumatic braking force amplifier or booster of a motor vehicle and comprises a relatively long cylinder bore 12 and a relatively short cylinder bore 14. In the example of embodiment illustrated the two cylinder bores 12 and 14 are parallel but this is not essential; the housing 10 is attached to the associated brake force amplifier preferably in such a manner that the cylinder bores are horizontal.

The longer cylinder bore 12 includes a first piston 16 which is formed in usual manner for cooperation with a force-exerting pushrod of the associated braking force amplifier and an equally sized second piston 18 lying further inwardly. In the longer cylinder bore 12 by the two pistons 16 and 18 a first pressure chamber lying therebetween is defined and by the second piston 18 a pressure chamber 22 lying therebehind. In the shorter cylinder bore 14 a third pressure chamber 24 is defined by a third piston 26. A fourth piston 28 bears on the end face of the third piston 26 remote from the third pressure chamber 24.

The three pressure chambers 20, 22 and 24 are connected to a first, second and third brake circuit connection 30, 32 and 34 respectively. The longer cylinder bore is sealed by an annular plug 36 in which the first piston 16 is sealingly guided and limited in its movement outwardly; the shorter cylinder bore 14 is sealed with a plug 38 which forms a stop for the fourth piston 28.

Attachable to the housing 10 in usual manner is a reservoir, not shown, for brake fluid. For this purpose on the housing 10 three reservoir connections 40, 42 and 44 are formed which have a connection controlled by each of the pistons 16, 18 and 26 to in each case one of the pressure chambers 20, 22 and 24. The connection between the first reservoir connection 40 and the first pressure chamber 20 includes a bleeder bore 46 in the housing 10 which opens into the cylinder bore 12 at a point which is left free by the piston 16 in its rest position illustrated but is covered at the start of each actuation. The connection between the second reservoir connection 42 and the second pressure chamber 22 includes a central valve 48 which is incorporated into the second piston 18 and is open in the rest position thereof. Finally, the connection between the third reservoir connection 44 and the third pressure chamber 24 includes a central valve 50 which is incorporated into the third piston 26 and is open in the rest position thereof.

The rest positions of the three pistons 16, 18 and 26 each defining one of the pressure chambers 20, 22 and 24 and the rest position of the fourth piston 28 are maintained by pressure springs 52, 54 and 56 for as long as no external force P acts on the first piston. The pressure spring 52 is installed as captive spring with pretensioning between the pistons 16 and 18. The pressure spring 54 consists of two coaxial coils which are incorporated between the second piston 18 and the end of the cylinder bore 12, and is held by the limited length of said cylinder bore under bias. The pressure spring 56 is installed between the third piston 26 and the end of the cylinder bore 14 and is also kept under bias by the limited length thereof.

The second piston 18 has a diametrical elongated slot 58 through which a resilient sleeve 60 installed crosswise in the housing 10 extends. The sleeve 60 is slit in its axial direction so that it forms a part of the connection which is controlled by the central valve 48 and exists between the second pressure chamber 22 and the second reservoir connection 42. In the rest position of the second piston 18 the associated central valve 48 is kept open by a stem 62 formed thereon abutting against the sleeve 60.

The third piston 26 likewise comprises a diametrical elongated slit 64 through which a resilient sleeve 66 incorporated crosswise into the housing 10 extends. The sleeve 66 is also slit in its longitudinal direction so that it forms a part of the connection which is controlled by the central valve 50 and exists between the third pressure chamber 24 and the third reservoir connection 44. This connection is kept open in the rest position of the third piston 26 by a stem 68 formed on the central valve 50 abutting against the sleeve 66.

The fourth piston 28 in the rest position illustrated is held free of play between the third piston 26 and the plug 38. At both end faces of the fourth piston 28 in the cylinder bore 14 a chamber 70 and 72 respectively is formed. The chamber 70 is permanently connected to the first pressure chamber 20 by a bore 74 emanating from the first brake circuit connection 30. The chamber 72 is connected by a bore 76 permanently to the second pressure chamber 22.

The fourth piston 28 has in the embodiment of FIG. 2 at its end facing the third piston 26 a smaller effective diameter than at its opposite end facing the plug 38. As a result on uniform pressure buildup in the two pressure chambers 20 and 22 the force acting from the chamber 72 on the fourth piston 28 is greater than the force acting from the chamber 70. Consequently, the fourth piston 28 moves on each actuation of the master brake cylinder jointly with the third piston 26, assuming that at least the brake circuit connected to the second pressure chamber 22 is intact.

In contrast, according to FIG. 3 the fourth piston 28 has like the other pistons 16, 18 and 26 the same diameter at both its ends. Consequently, the fourth piston 28 does not move when in the first pressure chamber 20 and thus in the chamber 70 the same pressure obtains as in the second pressure chamber 22 and thus in the chamber 72. If the master brake cylinder is actuated whilst all the brake circuits are free from trouble or when a pressure buildup in the second pressure chamber 22 does not occur due to a disturbance in the associated braking circuit the third piston 26 moves without the fourth piston 28 against the force of the pressure spring 56, to the right in FIG. 3. The fourth piston 28 moves in the embodiment of FIG. 3 against the force of the pressure spring 56 only when a pressure buildup in the pressure chamber 20 due to disturbance of the associated braking circuit does not occur or occurs to a lesser extent than in the second pressure chamber 22.

The embodiment according to FIG. 4 differs from that illustrated in FIG. 2 in that the connection of the second pressure chamber 22 to the associated second brake connection 32 is controlled by the fourth piston 28. This connection is interrupted by the fourth piston 28 in the rest position thereof illustrated and not freed until with increasing pressure in the second pressure chamber 22 the fourth piston 28 moves through a predetermined distance, in FIG. 4 to the right, away from its rest position.

The second brake circuit connection 32 can be connected for monitoring the fourth piston 28 to a pressure monitor or via a pressure difference warning switch to one of the other brake circuit connections 30 or 34. Thus, the driver of a vehicle equipped with the master brake cylinder can be warned because should the fourth piston 28 be seized due to rust or jam on actuation of the master brake cylinder the brake circuit connection 32 remains pressureless and a warning signal can thereby be triggered.

In the rest position of the fourth piston 28 the second brake circuit connection 32 controlled thereby is connected by a bleeder bore 78 to the second reservoir connection 42. The fourth piston 28 interrupts this connection as soon as it leaves its rest position. The central valve 48 in the second piston 18 can be dispensed with.

I claim:

1. Master brake cylinder for a hydraulic three-circuit brake system comprising a housing (10) containing two cylinder bores (12, 14), first and second pistons (16, 18) arranged one behind the other in one of the cylinder bores (12), means for displacing one only of said pistons by an external force (P) for subjecting a first or second pressure chamber (20, 22) to pressure, two additional pistons (26, 28) which are arranged one behind the other in the other cylinder bore (14), each being displaceable by the pressure in one of said first and second pressure chambers (20, 22) for subjecting a third pressure chamber (24) to pressure, three brake circuit connections (30, 32, 34) each connected to one of the pressure chambers (20, 22, 24) and three reservoir connections (40, 42, 44) which are controlled by piston movements, each being connected to one of the pressure chambers (20, 22, 24) as long as it is pressureless, characterized in that the third pressure chamber (24) is bordered by only one (26) of the two additional pistons (26, 28), the connection between the third pressure chamber (24) and the associated reservoir connection (44) being controlled by the said one (26) of said two additional pistons (26, 28) and the other (28) of the two additional pistons (26, 28) separating from each other chambers (70, 72) which are connected to the first and second pressure chambers (20, 22) respectively.

2. Master brake cylinder according to claim 1, characterized in that the two additional pistons (26, 28) in the rest state are held bearing against each other by a spring (56) arranged in the third pressure chamber (24).

3. Master brake cylinder according to claim 1 or 2, characterized in that the piston (26) bordering the third pressure chamber (24) includes a central valve (50) for controlling the connection to the associated reservoir connection (44).

4. Master brake cylinder according to claim 1 to 2, characterized in that the additional piston (28) not bordering the third pressure chamber (24) is a stepped piston whose larger end face is remote from the other additional piston (26) bordering the third pressure chamber (24).

5. Master brake cylinder according to claim 4, characterized in that the other of the two additional pistons (28) for as long as it assumes its rest position separates the pressure chamber (22) to the pressure of which it is exposed with its larger end face from the associated brake circuit connection (32).

* * * * *